Patented June 26, 1928.

1,675,295

UNITED STATES PATENT OFFICE.

BENJAMIN W. FREEMAN, OF CINCINNATI, OHIO, ASSIGNOR TO THE LOUIS G. FREEMAN COMPANY, OF CINCINNATI, OHIO, A CORPORATION OF OHIO.

PROCESS OF MAKING BOOTS AND SHOES.

No Drawing.  Application filed November 27, 1923.  Serial No. 677,319.

My present invention is a novel and improved process for use in the manufacture of boots and shoes having "cut-out" uppers.

In the present manufacture of shoes, particularly ladies' low cut shoes, pumps, slippers or the like, recent designs in these shoes have necessitated the cutting out of considerable portions of the vamp, quarters, or other parts of upper, leaving various "strap portions," thus constituting an openwork section in the shoe upper. My present invention or process is directed broadly to the manufacture of this type of footwear, and its object is to improve, simplify and perfect the manufacture of such footwear. Heretofore it has been customary and indeed necessary to cut out the parts of the upper, either quarters, vamp sections, foxings or tip portions, while the same has been held in a substantially flat position, and before the upper portions were attached or united into the shoe upper with linings. Such prior method was necessarily slow and expensive, requiring repeated handlings and skilled operators, and also being very difficult to unite accurately and properly after thus cut out. Furthermore, this work, prior to the invention of B. B. Brodfuehrer, Patent No. 1,605,916, granted April 13, 1926, necessitated the leaving of the lining solid and subsequent cutting out by hand, or the simple marking of the cut out portions and then cutting out by hand, a tedious, expensive and difficult proceeding, as well as one resulting in poor work, lack of uniformity and such difficulties. With the said invention of B. B. Brodfuehrer comprising the feature of applying to the shoe upper a reinforcing, either removably or permanently retained in the shoe, about the cut-out portions, however, it became possible to cut out completely the upper and lining, then reinforce the same to preserve intact the cut out portions during lasting, and thus to make a complete, better fitting shoe, and with the advantages of cutting out the openwork sections by machine, instead of by hand after the shoe was otherwise completed.

I have discovered the present process, which still further improves the methods of manufacturing this openwork or cut out shoe construction, wherein I am enabled to attach the entire shoe upper, stitching the vamp, quarters, tip, etc., together, as well as attaching the shoe at the rear seam, thus making a complete, closed and fitted upper, exactly as is now done to complete the upper materials before assembling on a last. Thereupon by means preferably of the machine shown in my copending application, Ser. No. 678,213, filed December 3, 1923, I cut out the openwork portions of the upper after it is thus stitched, united and ready for assembling on a last, thereby maintaining the stitching, attachment of upper section, etc., in proper alinement and with correct design, and then with the upper thus far completed, cutting out the openwork sections by a machine operation instantly and with the parts to be cut out held flat and preferably under tension, to insure accurate and perfect alinement and uniformity in the cutting out operation. This is a distinct novelty in this art, and my process I believe to be distinctly new, and I claim the same broadly herein.

The importance of this invention will be appreciated when the difficulty of cutting out on a flat surface, a sheet of material, such as that comprised in the shoe upper, which material is cut upon rounding lines, and particularly when it is realized that my process contemplates the holding and cutting of a predetermined portion of such shoe upper after it is united into the rounding contour of a closed or completely fitted upper. Furthermore the advantages of performing this cutting out portion after the upper is otherwise assembled will also be appreciated, as the lines of the shoe upper are thus enabled to be determined by the shoe stitching operations uniting same, and along the desired and designed lines of attachment, which latter is extremely difficult when the sections are first cut out because of the liability of distortion of the cut out portions, particularly where only narrow and numerous straps are left in this part of the shoe, the mere feeding of the shoe strap portions through the stitching machine tending constantly to distortion of the shoe design at such cut out parts.

While my invention contemplates the cutting out of the shoe and the formation of this openwork portion after the shoe upper is entirely stitched together, both at the vamp and heel—a method heretofore considered impossible until the invention of my said machine, and of the said Brodfuehrer method, I also believe that the operation of forming an openwork portion after the shoe upper materials are united, either at the forepart or at the heel part, as well as united and "closed" at both, is new and I wish to claim this method also herein.

In carrying out my process, I prefer to employ the machine illustrated in my said copending application, reference to which is hereby made. My process is, I believe, equally applicable to any design of openwork or cut out shoe uppers, irrespective of its intricacy, and irrespective of the portion or portions to be cut out, whether on the quarters, vamp, tongue, foxings or otherwise. I can, therefore, utilize the process in any design desired, and with cut-out toe portions, cut-out quarters, cut-out vamps or other section of the shoe. In carrying out my process I utilize the patterns for any shoe structure, and first stitch or unite these patterns together, in their solid and uncut state, thus following the present day established methods and with the well known stitching machines used in modern shoe factory production. The shoe upper and lining thus united and preferably with the vamp, toe portions and quarters all stitched together, presenting at this stage of manufacture the curved contour of a shoe upper adapted to fit upon a last, is then ready for a novel step of my present invention. Furthermore I can and even preferably do, stitch the shoe upper as thus far united, together at the heel, thus forming a completely closed shoe upper and in substantially its completed contour for last assembling. Heretofore the openwork sections would have had to be cut out while flat, and then united, as well as an operator could stitch them when making openwork shoe uppers. With the upper materials thus stitched and united, I then provide a cutting anvil or cutting die, having provision to form or cut the desired openwork design. Thereupon I subject the shoe upper to a suitable support to cooperate with said cutting anvil or die, and preferably said support permits the cooperation of the cutting anvil and any cooperating pressure device with means for relative movement to effect the cutting out of the completed upper by said cutting anvil, preferably as shown in my said copending application Ser. No. 678,213. Thereupon the upper materials—both outer, upper and lining having the cut out portions thus formed therein, are then subjected to the reinforcing process of the said Brodfuehrer application, Ser. No. 670,865, thus reinforcing the openwork portion to permit lasting without distorting said openwork portion or portions. Then the shoe materials are assembled on a last and either welt, McKay or turn shoe operations performed to complete the shoe.

Thus I am enabled, by my present process, to manufacture a shoe with openwork portion or portions, and formed at any part, and with perfect uniformity, clean, clear cutting entirely through the upper and lining, irrespective of the material, whether leather, satin, suede or other desired material, in exact alinement and furthermore with the advantage of cooperating designs when these are desired, in vamp, in quarter, tip or the like, first uniting the upper without danger of distorting, then cutting completely, and then reinforcing for lasting, to prevent distortion, and all this by simple, established and economical operations, and with the shoe machines now employed, together with the simple addition of my said machine, Ser. No. 678,213.

While it is usually desirable, after the openwork portion has been cut out, to then stitch and upper and lining together, along the remaining strap portions, edges, and the like, yet it is equally feasible to cement or paste the two portions together, thus uniting them. By either procedure the upper and lining portions are first assembled and stitched as above explained, prior to being operated on for the openwork formation, and in case it is desired to cement the remaining strap portions, I may provide on the cutting anvil or machine device, means to both cut out the openwork portions, and also to indent or form an imitation stitch on the remaining strap portions. This latter feature is not necessary in case the upper and lining are subsequently stitched together around the openwork cut out portions, but is desirable where cementing is utilized.

Furthermore, while my process includes the cutting out simultaneously of the assembled upper leather and its lining, and preferably performing this operation on the shoe upper after it is stitched, or cemented, and closed at the heel as a complete fitted upper, ready for assembling on the last, and either with or without the reinforcing at the cut out portion, it will be appreciated that each and every portion of the design need not necessarily be thus completely cut out. In very intricate forms, I may apply the complete cutting out action to a portion of the design, leaving the rest or some minor details to be subsequently cut out. In any event the simultoneous cutting and removing of upper and lining in manufacturing shoes with the new and modern type of cut out designs, many of such designs being highly intricate and leaving narrow straps or strips and delicate interlacings, by the cutting out action of a machine as distinguished from the old hand and knife method, carries out my invention, even though the entire design is not thus completely cut out.

My invention is further described and defined in the form of claims as follows:

1. The improved process of making boots or shoes having openwork portions in the upper materials, which consists in preparing the upper materials, securing them together, uniting the upper materials into a closed unit, then cutting out the openwork portions by cutting entirely through upper and lining materials, applying a reinforcing to the cut-out portions, then assembling the reinforced and cut-out materials on a last, and completing the shoe.

2. The improved process of manufacturing footwear having openwork upper portions, which consists in uniting the materials forming the upper into a closed upper ready for assembling on a last, then cutting out predetermined openwork portions simultaneously, then reinforcing the cut-out portions by removable strengthening material, and then assembling the reinforced cut-out upper on a last and completing the shoe.

3. The improved process of making boots or shoes having cut-out portions in the upper and lining materials, which comprises first assembling the upper materials into the form of a fitted shoe upper, uniting such upper to the lining, then cutting out the design, and then adding reinforcing material, applied over the cut-out portions, thus preparing the upper and lining as a fitted upper for assembling on a last.

In testimony whereof, I have signed my name to this specification.

BENJ. W. FREEMAN.